US008293199B2

(12) United States Patent
Beutel et al.

(10) Patent No.: US 8,293,199 B2
(45) Date of Patent: *Oct. 23, 2012

(54) PROCESS FOR PREPARATION OF COPPER CONTAINING MOLECULAR SIEVES WITH THE CHA STRUCTURE, CATALYSTS, SYSTEMS AND METHODS

(75) Inventors: Tilman W. Beutel, Neshanic Station, NJ (US); Ivor Bull, Hopewell Junction, NY (US); Ahmad Moini, Princeton, NJ (US); Michael Breen, Erie, PA (US); Martin Dieterle, Jersey City, NJ (US); Saeed Alerasool, Princeton Junction, NJ (US); Barbara Slawski, North Royalton, OH (US)

(73) Assignee: BASF Corporation, Florham Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/970,582

(22) Filed: Dec. 16, 2010

(65) Prior Publication Data
US 2011/0165052 A1    Jul. 7, 2011

Related U.S. Application Data

(60) Provisional application No. 61/287,705, filed on Dec. 18, 2009.

(51) Int. Cl.
*B01D 53/56* (2006.01)
*B01D 53/94* (2006.01)
*B01J 29/00* (2006.01)
*B01J 29/072* (2006.01)
*F01N 3/10* (2006.01)
*F01N 3/28* (2006.01)

(52) U.S. Cl. .................. 423/213.2; 423/239.2; 423/700; 502/60; 502/345; 502/439; 60/299

(58) Field of Classification Search .................... 502/60, 502/345, 439; 423/700, 213.2, 239.2; 60/299
See application file for complete search history.

(56) References Cited

U.S. PATENT DOCUMENTS

| | | | |
|---|---|---|---|
| 3,346,328 A * | 10/1967 | Sergeys et al. ............. | 423/213.2 |
| 4,220,632 A | 9/1980 | Pence et al. | |
| 4,297,328 A | 10/1981 | Ritcher et al. | |
| 4,440,871 A | 4/1984 | Lok et al. | |
| 4,544,538 A | 10/1985 | Zones | |
| 4,567,029 A | 1/1986 | Wilson et al. | |
| 4,735,927 A | 4/1988 | Gerdes et al. | |
| 4,735,930 A | 4/1988 | Gerdes et al. | |
| 4,861,743 A | 8/1989 | Flank et al. | |
| 4,867,954 A | 9/1989 | Staniulis et al. | |
| 4,874,590 A | 10/1989 | Staniulis et al. | |
| 4,961,917 A | 10/1990 | Byrne | |
| 5,024,981 A | 6/1991 | Speronello et al. | |
| 5,041,270 A | 8/1991 | Fujitani et al. | |
| 5,096,684 A | 3/1992 | Guth et al. | |
| 5,233,117 A | 8/1993 | Barger | |
| 5,313,792 A | 5/1994 | Katoh et al. | |
| 5,417,949 A | 5/1995 | McWilliams et al. | |
| 5,477,014 A | 12/1995 | Dunne et al. | |
| 5,516,497 A | 5/1996 | Speronello et al. | |
| 5,589,147 A | 12/1996 | Farnos et al. | |
| 5,589,149 A | 12/1996 | Garland et al. | |
| 5,733,837 A | 3/1998 | Nakatsuji et al. | |
| 5,884,473 A | 3/1999 | Noda et al. | |
| 6,139,808 A | 10/2000 | Mizuno et al. | |
| 6,162,415 A | 12/2000 | Liu et al. | |
| 6,171,556 B1 | 1/2001 | Burk et al. | |
| 6,316,683 B1 | 11/2001 | Janssen et al. | |
| 6,319,487 B1 | 11/2001 | Liu et al. | |
| 6,350,298 B1 | 2/2002 | Su et al. | |
| 6,376,562 B1 | 4/2002 | Ihm et al. | |
| 6,395,674 B1 | 5/2002 | Fung et al. | |
| 6,503,863 B2 | 1/2003 | Fung et al. | |
| 6,569,394 B2 | 5/2003 | Fischer et al. | |
| 6,576,203 B2 | 6/2003 | Abe et al. | |
| 6,606,856 B1 | 8/2003 | Brown et al. | |
| 6,685,905 B2 | 2/2004 | Mertens et al. | |
| 6,696,032 B2 | 2/2004 | Mertens et al. | |
| 6,709,644 B2 | 3/2004 | Zones et al. | |
| 6,974,889 B1 | 12/2005 | Verduijn et al. | |
| 7,014,827 B2 | 3/2006 | Mertens et al. | |
| 7,049,261 B2 | 5/2006 | Nam et al. | |

(Continued)

FOREIGN PATENT DOCUMENTS

DE                394541 A1     6/1990
(Continued)

OTHER PUBLICATIONS

Non-Final Office Action in U.S. Appl. No. 12/612,142, mailed Dec. 29, 2010, 26 pgs.
Brandenberger, Sandro et al., "The State of the Art in Selective Catalytic Reduction of NOx by Ammonia Using Metal-Exchanged Zeolite Catalysts", *Catalysis Reviews* 50:4 2008, 41 pgs.
Cavataio, Giovanni et al., "Cu/Zeolite SCR on High Porosity Filters: Laboratory and Engine Performance Evaluations", *SAE International, Ford Motor Company* 2009, 10 pgs.
Cavataio, Giovanni et al., "Development of Emission Transfer Functions for Predicting the Deterioration of a Cu-Zeolite SCR Catalyst", *SAE International, Ford Motor Company* 2009, 1-17.
Cavataio, Giovanni et al., "Enhanced Durability of a Cu/Zeolite Based SCR Catalyst", *SAE Int. J. Fuels Lubr, vol. 1, Issue 1* 2008, 477-487.
Cavataio, Giovanni et al., "Laboratory Testing of Urea-SCR Formulations to Meet Tier 2 Bin 5 Emissions", *SAE International, 2007 World Congress* 2007, 16 pgs.

(Continued)

*Primary Examiner* — Timothy Vanoy
(74) *Attorney, Agent, or Firm* — Melanie L. Brown

(57) ABSTRACT

Disclosed are processes for the preparation of copper containing molecular sieves with the CHA structure having a silica to alumina mole ratio greater than about 10, wherein the copper exchange step is conducted via wet state exchanged and prior to the coating step and wherein in the copper exchange step a liquid copper solution is used wherein the concentration of copper is in the range of about 0.001 to about 0.25 molar using copper acetate and/or an ammoniacal solution of copper ions as copper source. Catalysts made by the processes, catalyst systems and methods of treating exhaust gas with the molecular sieves and catalysts are also disclosed.

18 Claims, No Drawings

U.S. PATENT DOCUMENTS

| | | | |
|---|---|---|---|
| 7,094,389 B2 | 8/2006 | Cao et al. | |
| 7,182,927 B2 | 2/2007 | Tran et al. | |
| 7,229,597 B2 | 6/2007 | Patchett et al. | |
| 7,601,662 B2 | 10/2009 | Bull et al. | |
| 2001/0038812 A1 | 11/2001 | Yavuz et al. | |
| 2001/0043896 A1 | 11/2001 | Domesle et al. | |
| 2002/0016252 A1 | 2/2002 | Takahashi et al. | |
| 2002/0084223 A1 | 7/2002 | Feimer et al. | |
| 2003/0069449 A1 | 4/2003 | Zones et al. | |
| 2004/0082466 A1 | 4/2004 | Cao et al. | |
| 2004/0098973 A1 | 5/2004 | Tennison et al. | |
| 2004/0166035 A1 | 8/2004 | Noda et al. | |
| 2004/0171476 A1 | 9/2004 | Nam et al. | |
| 2004/0209760 A1 | 10/2004 | Yoshikawa | |
| 2005/0031514 A1 | 2/2005 | Patchett et al. | |
| 2005/0096214 A1 | 5/2005 | Janssen et al. | |
| 2006/0039843 A1 | 2/2006 | Patchett et al. | |
| 2006/0115403 A1 | 6/2006 | Yuen | |
| 2006/0228283 A1 | 10/2006 | Malyala et al. | |
| 2007/0000243 A1 | 1/2007 | Liu et al. | |
| 2007/0043249 A1 | 2/2007 | Cao et al. | |
| 2007/0149385 A1 | 6/2007 | Liu et al. | |
| 2007/0286798 A1 | 12/2007 | Cao et al. | |
| 2008/0241060 A1 | 10/2008 | Li et al. | |
| 2008/0317999 A1 | 12/2008 | Patchett et al. | |
| 2009/0048095 A1 | 2/2009 | Li et al. | |
| 2009/0060809 A1 | 3/2009 | Shioya et al. | |
| 2009/0196812 A1 | 8/2009 | Bull et al. | |
| 2010/0092362 A1 | 4/2010 | Li et al. | |
| 2010/0290963 A1 | 11/2010 | Andersen et al. | |
| 2011/0165052 A1* | 7/2011 | Beutel et al. | 423/239.2 |
| 2011/0182791 A1* | 7/2011 | Fedeyko et al. | 423/237 |
| 2011/0200505 A1* | 8/2011 | Cavataio et al. | 423/213.2 |

FOREIGN PATENT DOCUMENTS

| | | |
|---|---|---|
| DE | 10059520 | 5/2001 |
| EP | 0396085 | 11/1990 |
| EP | 0624393 A1 | 11/1994 |
| EP | 0773057 A1 | 5/1997 |
| EP | 0950800 A2 | 10/1999 |
| EP | 1837489 A1 | 9/2007 |
| JP | 6-48725 | 2/1994 |
| JP | 05-057194 | 9/1994 |
| WO | WO-99/56859 | 11/1999 |
| WO | WO-03/035549 A1 | 5/2003 |
| WO | WO-2007/004774 A1 | 1/2007 |
| WO | WO-2007/005308 A2 | 1/2007 |
| WO | WO-2008/019585 A1 | 2/2008 |
| WO | WO-2008/118434 A1 | 10/2008 |
| WO | WO-2008/132452 A2 | 11/2008 |
| WO | 20090141324 A1 | 11/2009 |

OTHER PUBLICATIONS

Centi, Gabriele et al., "Nature of active species in copper-based catalysts and their chemistry of transformation of nitrogen oxides", *Applied Catalysts A General* 132 1995, 179-259.

Centi, G., "Review Paper on Zeolites in Corma Treatise", *Zeolites and Catalysts*, vol. 1, 51 pgs, 2010.

Chang, Russell et al., "Thermal durabiluty and deactivation of Cuzeolite SCR catalysts", *Johnson Matthey Inc.*, 1 pg.

Cheng, Yisun et al., "Sulfur Tolerance and DeSOx Studies on Diesel SCR Catalysts", *SAE Int. J. Fuels Lubr.*, vol. 1, Issue 1 2008, 471-476.

Cheng, Yisun et al., "The Effects of SO2 and S03 Poisoning on Cu/Zeolite SCR Catalysts", *SAE International* 2009, 7 pgs.

Fickel, Dustin W. et al., "Copper Coordination in Cu-SSZ-13 and Cu-SSZ-16 Investigated by Variable-Temperature XRD", *J. Phys. Chem C*, 114 2010, 1633-1640.

Fickel, Dustin W., "Investigating the High-Temperature Chemistry of Zeolites: Dehydrogenation of Zeolites and NH3-SCR of Copper Exchanged Small-Pore Zeolites", *Dissertation* 2010, 1-199.

Girard, James et al., "Influence of Hydrocarbon Storage on the Durabiluty of SCR Catalysts", *SAE International, 2008 World Congress* 2008, 10 pgs.

Kim, Moon H. et al., "Water Tolerance of DeNOx SCR Catalysts Using Hydrocarbons: Findings, Improvements and Challenges", *Korean J. Chem. Eng.* 18(5) 2001, 725-740.

Long, R. Q. et al., "Selective Catalytic Oxidation (SCO) of Ammonia to Nitrogen over Fe-Exchanged Zeolites", *Journal of Catalysis* 201, 145-152.

Pelella, B. I. et al., "Enhancement of Hydrothermal Stability of Cu-ZSM5 Catalyst for NO Decomposition", *Kinetics and Catalysis*, vol. 47, No. 5 2006, 728-736.

Pluth, J. J. et al., "Positions of Cations and Molecules in Zeolites with the Chabazite Framework. IV Hydrated and Dehydrated Cu2+-Exchanged Chabazite", *Mat. Res. Bull*., vol. 12 1977, 1001-1007.

Qi, Gongshin et al., "Selective Catalytic Reduction of Nitric Oxide with Ammonia over ZSM-5 Based Catalysts for Diesel Engine Applications", *Catal Lett* 121 2008, 111-117.

Rahkamaa-Tolonen, Katariina et al., "The effect of NO2 on the activity of fresh and aged zeolite catalysts in the NH3-SCR reaction", *Catalysts Today*, 100 2005, 217-222.

Xu, Lifeng et al., "Impact of a Cu-zeolite SCR Catalyst on the Performance of a Diesel LNT+SCR System", *SAE International* 2009, 12 pgs.

Final Office Action in U.S. Appl. No. 12/612,142, mailed Jun. 10, 2011, 21 pgs.

Anderson, Paul J. et al., "Small pore molecular sieve supported transition metal catalysts for the selective catalytic reduction of NOx with $NH_3$", Abstract, 1 pg.

Schmieg, Steven J., et al., "Thermal Durability of $NH_3$-SCR Catalysts for Diesel NOx Reduction", 1 pgs.

Deka, U., et al, "Insight into the nature of the active site in Cu-CHA for $NH_3$- SCR", University Utrecht, Netherlands, 1 pgs.

Non-Final Office Action in U.S. Appl. No. 12/361,980, mailed Mar. 23, 2011, 24 pgs.

"Chinese Journal of Catalysis", *Thermal and Hydrothermal Stability of SAPO-34 Molecular Sieve*, vol. 17, No. 6 Nov. 1996, 9 pgs.

"Fourth International Congress on Catalysis and Automotive Pollution Control", Apr. 1997, 7.

Gabriele Centi Declaration of Sep. 22, 2010, 11 pgs.

Machine Translation from EPO of DE 394541 A1, 8 pgs, Jun. 1990.

Non-Final Office Action in U.S. Appl. No. 12/361,980, mailed Sep. 22, 2010, 26 pgs.

Non-Final Office Action, dated Feb. 26, 2010 in U.S. Appl. No. 12/480,360, 19 pgs.

PCT International Search Report and Written Opinion in PCT/US2009/032610, Jul. 16, 2009, 20 pgs.

PCT International Search Report and Written Opinion for PCT/US2008/055140, 11, (2008).

Reexam Order in Pat. No. 7,601,662, 18 pgs, Nov. 16, 2010.

Reexamination Request in Pat. No. 7,601,662, 35 pgs, Nov. 16, 2010.

Request for Inter Partes Reexamination, dated Sep. 28, 2010, 77 pgs.

U.S. Appl. No. 10/634,659, filed Aug. 5, 2003.

Non-Final Office Action mailed Jan. 13, 2009 for U.S. Appl. No. 12/038,423 filed mailed Jan. 13, 2009, 16 pgs.

Akolekar, Deepak B. et al., "FTIR investigations of the adsorption and disproportionation of NO on Cu-exchanged silicoaluminophosphate of type 34", *J. Chem. Soc., Faraday Trans.*, 94(11 1998, 155-160.

Amiridis, Michael D. et al., "Selective catalytic reduction of nitric oxide by hydrocarbons", *Applied Catalysis* 1996, 203-227 pgs.

Ashtekar, Sunil et al., "Small-Pore Molecular Sieves SAPO-34 and SAPO-44 with Chabazite Structure: A Study of Silicon Incorporation", *J. Phys. Chem.* 1994, 98 1994, 4878-4883.

Baerlocher, Ch. et al., "Atlas of Zeolite Framework Types", *Elsevier—Fifth Revised Edition* 2001, 5 pages.

Barger, Paul T. et al., "Hydrothermal Stability of SAPO-34 in the Methanol-to-Olefins Process", *Tha Arabian Journal for Science and Engineering*, vol. 21, No. 2 Apr. 1996, 10.

Barthomeuf, Denise, "Journal: NATO ASI Series, Series C: Mathematical and Physical Sciences Issue 444", *Generation of acidity (amount and strength) in siliconaluminophosphates (SAPO zeolites), Examples of SAPO-5*; pp. 375-390 1994, 17 pgs.

Breck, Donald W., "Zeolite Molecular Sieves", *John Wiley & Sons, A Wiley-Interscience Publication* 1974, 6 pgs.

Centi, G. et al., "Role of the Nature of Copper Sites in the Activity of Copper-Based Catalysts for NO Conversion", *Research on Chemical Intermediates*, 17 1992, 125-135 pgs.

Chen, Jiesheng et al., "Silicoaluminophosphate No. eighteen (SAPO-18): a new mircoporous solid acid catalyst", *Catalysis Letters* 28 1994, 241-248.

Chung, Sung Y. et al., "Effect of Si/Alratio of Mordenite and ZSM-5 type Zeolite Catalysts on Hydrothermal Stability for NO Reduction by Hydrocarbons", *Studies in Surface Science Catalysis*, vol. 130 2000, 1511-1516.

Dedecek, Jiri et al., "Effect of Framework Charge Density on Catalytic Activity of Copper Loaded Molecular Sieves of Chabazite Structure in Nitrogen (II) Oxide Decomposition", *Collect. Czech. Chem. Commun.* (vol. 65) 2000, 343-351 pgs.

Dedecek, J. et al., "Siting of the Cu+ ions in dehydrated ion exchanged synthetic and natural chabasites: a Cu+ photoluminescence study", *Microporous and Mesoporous Materials* 32 1999, 13 pgs.

Frache, A. et al., "Catalytic DeNOx activity of cobalt and copper ions in microporous MeALPO-34 and MeAPSO-34", *Catalysis Today* 75 2002, 359-365.

Frache, A. et al., "CuAPSO-34 catalysts for N20 decomposition in the presence of H2O. A study of zeolite structure stability in comparison to Cu-SAPO-34 and Cu-ZSM-5", Topics in Catalysis vol. 22, Nos. 1/2 2003, 5.

Frache, A. et al., "Spectroscopic characterisation of microporous aluminophosphate materials with potential application in environmental catalysis", *Catalysis Today* 77 2003, 371-384.

Frache, A. et al., "Synthesis, Spectroscopic and Catalytic Properties of Cobalt and Copper Ions in Aluminophosphates with Chabasite-Like Structure, Studies of the NO Reactivity", *Studies in Surface Science and Catalysis* 140 2001, 269-277.

Hartmann, Martin et al., "Transition-Metal Ions in Aluminophosphate and Silicoaluminophosphate Molecular Sieves: Location, Interaction with Adsorbates and Catalytic Properties", *Chem. Rev.* 99 (3) 1999, 635-663.

Heck, Ronald M. et al., "Catalytic Air Pollution Control", *A John Wiley & Sons, Inc. Publication—Wiley-Interscience* 2002, 3 pgs.

Ishihara, Tatsumi et al., "Copper Ion Exchanged Silicoaluminophosphate (SAPO) as a Thermostable Catalyst for Selective Reduction of NOx with Hydrocarbons", *Studies in Surface Science and Catalysis*, vol. 84 (1994) 1994, 1493-1500.

Ishihara, Tatsumi et al., "Copper Ion-Exchanged SAPO-34 as a Thermostable Catalyst for Selective Reduction of NO with C3H6", *Journal of Catalysis*, vol. 169 1997, 10 pgs.

Ishihara, Tatsumi et al., "Selective Reduction of Nitrogen Monoxide with Propene over Cu-Silico-aluminophosphate (SAPO) under Oxidizing Atmosphere", *The Chemical Society of Japan* (1992) 1992, 2119-2122.

Ishihara, Tatsumi et al., "Thermostable Molecular Sieves, Silicoaluminophosphate (SAPO)-34, for the Removal of NOx with C3H6 in the Coexistence of O2, H2O, and SO2", *Ind. Eng. Chem. Res.*, 36 1997, 17-22.

Kwak, Ja H. et al., "Excellent activity and selectivity of Cu-SSZ-13 in the selective catalytic reduction of NOx with NH3", *Journal of Catalysis* 2010, 4 pgs.

Li, Yuejin et al., "Selective NH3 Oxidation to N2 in a Wet Stream", *Applied Catalysis B: Environmental* 13 1997, 131-139

Lok, B. M. et al., "Silicoaluminophosphate Molecular Sieves: Another New Class of Microporous Crystalline Inorganic Solids", *Journal of the American Chemical Society*, vol. 106 1984, 6092-6093.

Marchese, L. et al., "ALPO-34 and SAPO-34 synthesized by using morpholine as templating agent. FTIR and FT-Raman studies of the host-guest and guest-guest interactions within the zeolitic framework", *Microporous and Mesoporous Materials* 30 1999, 145-153.

Medros, F. G. et al., "Dual-Catalyst System to Broaden the Window of Operability in the Reduction of NOx with Ammonia", *Ind. Eng. Chem. Res.* 28 1989, 1171-1177.

Miller, William R. et al., "Urea selective catalytic reduction", *2010 Factiva, Inc.* 2000, 9 pgs.

Misono, Makoto, "Catalytic reduction of nitrogen oxides by bifunctional catalysts", *Baltzer Science Publishers* vol. 2, No. 2 Dec. 1998, 24 pgs.

Palella, B. I. et al., "On the hydrothermal stability of CuAPSO-34 mircoporous catalysts for N2O decomposition: a comparison with CuZSM-5", *Journal of Catalysis* 217 2003, 100-106.

Prakash, A M. et al., "Synthesis of SAPO-34: High Silicon Incorporation in the Presence of Morpholine as Template", *J. Chem. Soc. Faraday Trans.* 1994, 90(15) 1994, 2291-2296.

Rebrov, E. V. et al., "Development of the Kinetic Model of Platinum Catalyzed Ammonia Oxidation in a Microreactor", *Chemical Engineering Journal* 90 2002, 61-76.

Torre-Abreu, C. et al., "Selective Catalytic Reduction of NO on Copper-Exchanged Zeolites: The Role of the Structure of the Zeolite in the Nature of Copper-Active Sites", *Catalysis Today* 54 1999, 407-418.

Treacy, M.M. J. et al., "Proceedings of the 12th International Zeolite Conference", *Materials Research Society Conference Proceedings IV* Jul. 5-10, 1998, 6.

Uzunova, Ellie L. et al., "Adsorption of NO on Cu-SAPO-34 and Co-SAPO-34; A Periodic DFT Study", *J. Phys. Chem C* 2008 2008, 2632-2639.

Watanabe, Yoshihide et al., "Multinuclear NMR Studies on the Thermal Stability of SAPO-34", *Journal of Catalysis* 1993, 430-436 pgs.

Zelenka, P. et al., "Exhaust gas aftetreatment systems for diesel engines with respect to future emission legislation", *Diesel Engine Technology* 96 May 1993, 13 pgs.

Final Office Action in U.S. Appl. No. 12/480,360, dated Jul. 26, 2010, 11 pgs.

Action Closing Prosecution in U.S. Appl. No. 95/001,453, mailed Nov. 18, 2011, 102 pgs.

Centi, Gabriele et al., "Sustainable Industrial Processes", 81 pgs, 2009.

Dedecek, Jiri et al., "Effect of Framework Charge Density on Catalytic Activity of Copper Loaded molecular Sieves of Chabazite Structure in Nitrogen(II) Oxide Decomposition", *Molecular Sieves of Chabazite Structure*. Feb. 23, 2000, 343-351.

Halasz, J. et al., "Selective Reduction of NO Over Copper-Containing Modified Zeolites", *Studies in Surface Science and Catalysis*, vol. 96 1995, 675-685.

Heck, Ronald M. et al., "Catalytic Air Pollution Control—Commercial Technology", *Second Edition* 2002 , 9 pgs.

Ishihara, Tatsumi et al., "Selective Reduction of Nitrogen Monoxide with Propene Over Cu-Silico-aluminophosphate (SAPO) Under Oxidizing Atmosphere", *Chemistry Letters, The Chemical Society of Japan* 1992, 2119-2122.

Korhonen, Satu T. et al., "Isolated Cu2+ ions: active sites for selective catalytic reduction of NO+", *ChemComm* Nov. 15, 2010, 3 pgs.

McEwen, Jean-Sabin et al., "Selective Catalytic Reduction of NOx by ammonia on metal-exchanged zeolite catalysts", *Prepr. Pap-Am. Chem. Soc., Div. Fuel Chem.*, 55 2011, 1 pg.

Non-Final Office Action in U.S. Appl. No. 12/480,360, mailed Feb. 1, 2012, 20 pgs.

Non-Final Office Action in U.S. Appl. No. 12/970,545, mailed Dec. 5, 2011, 21 pgs.

Heck, Ronald M. et al., "Catalytic Air Pollution Control—Commercial Technology", *Second Edition* 2002, 9 pgs.

Declaration by Gabriele Centi, Ph.D, 48 pgs, 2012.

Declaration by Johannes A. Lercher, PH.D., 13 pgs., 2012.

Declaration by Wolfgang Strehlau, PH.D., 18 pgs, 2012.

Third Party Comments After Patent Owner's Response After ACP Under 37 CFR 1.951, dated Jan. 18, 2012, 40 pgs.

Action Closing Prosecution in U.S. Appl. No. 95/001,453, mailed May 11, 2012, 69 pgs.

Non-Final Office Action in U.S. Appl. No. 12/970,545, dated Mar. 20, 3012, 14 pgs.

Final Office Action in U.S. Appl. No. 12/480,360, dated Jul. 18, 2012, 10 pgs.

\* cited by examiner

PROCESS FOR PREPARATION OF COPPER CONTAINING MOLECULAR SIEVES WITH THE CHA STRUCTURE, CATALYSTS, SYSTEMS AND METHODS

CROSS-REFERENCE TO RELATED APPLICATIONS

This application claims the benefit of priority under 35 U.S.C. §119(e) to U.S. Provisional Application Ser. No. 61/287,705, filed Dec. 18, 2009 the disclosure of which is hereby incorporated herein by reference thereto.

BACKGROUND

Embodiments of the invention relates to a process for the preparation of copper containing molecular sieves with the CHA structure having a silica to alumina mole ratio greater than about 10. In specific embodiments, copper exchange is conducted via wet state exchange and prior to coating.

Both synthetic and natural zeolites and their use in promoting certain reactions, including the selective reduction of nitrogen oxides with a reductant like ammonia, urea or a hydrocarbon in the presence of oxygen, are well known in the art. Zeolites are aluminosilicate crystalline materials having rather uniform pore sizes which, depending upon the type of zeolite and the type and amount of cations included in the zeolite lattice, range from about 3 to 10 Angstroms in diameter. Chabazite (CHA) is a small pore zeolite with 8 member-ring pore openings (~3.8 Angstroms) accessible through its 3-dimensional porosity. A cage like structure results from the connection of double six-ring building units by 4 rings.

X-ray diffraction studies on cation locations in Chabazite have identified seven cation sites coordinating with framework oxygens, labeled A, B, C, D, F, H, and I. They are located in the center of double six-membered ring, on or near the center of the six-membered ring in Chabazite cage, and around the eight-membered ring of the chabazite cage, respectively. The C site is located slightly above the six-membered ring in the Chabazite cage and the F, H and I sites are located around the eight-membered ring in the Chabazite cage (see Mortier, W. J. "Compilation of Extra Framework Sites in Zeolites", Butterworth Scientific Limited, 1982, p 11 and Pluth, J. J., Smith, J. V., Mortier, W. J., Mat. Res. Bull., 12 (1977) 1001).

The catalysts employed in the SCR process ideally should be able to retain good catalytic activity over the wide range of temperature conditions of use, for example, 200° C. to 600° C. or higher, under hydrothermal conditions. Hydrothermal conditions are often encountered in practice, such as during the regeneration of a soot filter, a component of the exhaust gas treatment system used for the removal of particles.

Metal-promoted zeolite catalysts including, among others, iron-promoted and copper-promoted zeolite catalysts, for the selective catalytic reduction of nitrogen oxides with ammonia are known. Iron-promoted zeolite beta (U.S. Pat. No. 4,961,917) has been an effective commercial catalyst for the selective reduction of nitrogen oxides with ammonia. Unfortunately, it has been found that under harsh hydrothermal conditions, for example exhibited during the regeneration of a soot filter with temperatures locally exceeding 700° C., the activity of many metal-promoted zeolites begins to decline. This decline is often attributed to dealumination of the zeolite and the consequent loss of metal-containing active centers within the zeolite.

WO 2008/106519 discloses a catalyst comprising: a zeolite having the CHA crystal structure and a mole ratio of silica to alumina greater than 15 and an atomic ratio of copper to aluminum exceeding 0.25. The catalyst is prepared via copper exchanging $NH_4^+$-form CHA with copper sulfate or copper acetate. The copper concentration of the aqueous copper sulfate ion-exchange step varies from 0.025 to 1 molar, where multiple copper ion-exchange steps are needed to attain target copper loadings. The copper concentration of the aqueous copper acetate ion-exchange step varies from 0.3 to 0.4 molar conducting a wet state exchange, thus, a separate copper exchange step prior to the coating process. Conducting copper exchange step during the coating the copper concentration is 0.25 and 0.12 (examples 16 and 17).

US 2008/0241060 and WO 2008/132452 disclose that zeolite material can be loaded with iron and/or copper. In the examples of US 2008/0241060 the copper ion-exchange is not described. It is stated in WO 2008/132452 that multiple aqueous ion-exchanges were carried out to target 3 wt % Cu. No details of reaction conditions were provided.

Dedecek et al. describes in Microporous and Mesoporous Materials 32 (1999) 63-74 a direct copper exchange into $Na^+$-, $Ca^{2+}$-, $Cs^+$-, $Ba^{2+}$-form of Chabazite. An aqueous solution of copper acetate is used with copper concentrations varying between 0.20 and 7.6 wt %, thus between 0.001 and 0.1 molar. The liquid to solid ratio varies between 20 and 110. The silica to alumina ratio is between 5 and 8.

Although typically the catalysts are produced in a similar manner, the NOx conversion activity of the catalysts fluctuates strongly from one experiment to the other (see table 1). The synthesis of copper containing molecular sieve with the CHA structure is a remarkable complex reaction. In general, the preparation includes four main sub-steps i) crystallization of the organic template containing Na/K-Chabazite, ii) calcination of Na/K-Chabazite, iii) $NH_4$-exchange to form $NH_4$-Chabazite and iv) metal-exchange into to $NH_4$-Chabazite to form metal-Chabazite.

In addition, all these sub-steps like metal-exchange into to $NH_4$-Chabazite to form metal-Chabazite can be divided in additional sub-sub-steps a) forming metal-Chabazite step, b) separation step, c) optionally drying step and d) calcination step. For example the sub-sub step a), the forming of metal-containing zeolite may be influenced by (1) the starting material chosen, (2) concentration of each starting material, (3) liquid:solid ratio of that starting material, (4) reaction time, (5) reaction temperature, (6) pH value or (7) additional reaction conditions like stirring or so.

Up to now the most important process features that cause fluctuations in the NOx conversion activity are not determined yet.

In general, the SCR catalyst based on that Chabazite molecular sieve should exhibit comparable NOx conversion activity with the catalysts of the state of the art obtained via multi-step synthesis (copper exchange into $NH_4$-Chabazite). In general, the catalyst should exhibit both good low temperature NOx conversion activity ($NO_x$ conversion>50% at 200° C.) and good high temperature NOx conversion activity ($NO_x$ conversion>70% at 450° C.). The $NO_x$ activity is measured under steady state conditions at maximum $NH_3$-slip conditions in a gas mixture of 500 ppm NO, 500 ppm $NH_3$, 10% $O_2$, 5% $H_2O$, balance $N_2$ at a volume-based space velocity of 80,000 $h^{-1}$.

There is an on-going desire to improve the process of preparing copper containing molecular sieves with the CHA structure.

SUMMARY

An aspect of the invention pertains to a process for the preparation of copper containing molecular sieves with the CHA structure having a silica to alumina mole ratio greater than about 10. In a first embodiment, copper exchange is performed with copper containing molecular sieves with the CHA structure having a silica to alumina mole ratio greater than about 10 is conducted via wet state exchange and prior to coating. In more specific embodiments, the copper exchange utilizes a liquid copper solution is used wherein the concentration of copper is in the range of about 0.001 to about 0.25 molar using copper acetate and/or an ammoniacal solution of copper ions as copper source. In one or more embodiments, the process can be modified so the liquid to solid ratio which is defined here as the weight of water used to prepare the Cu solution relative to the weight of the starting zeolite used in the copper exchange step is in the range from about 2 to about 80. In one or more embodiments, the process can be modified so that the copper is exchanged into a $Na^+$-form or into a $NH_4$-form of Chabazite. In an embodiment, the process can be modified so that the copper concentration is in the range from about 0.1 to about 0.25. In an embodiment, the process o can be modified so that the copper concentration is in the range from about 0.15 to about 0.225.

One or more embodiments pertains to copper containing molecular sieves with the CHA structure, obtainable or obtained by the process of any of the first through fifth embodiments. In one or mores embodiments, the molecular sieve shows a weight ratio of exchanged copper to copper oxide of at least about 1. In one or more embodiment, the copper containing molecular sieves show at least two signals in a $H_2$ TPR spectra, whereas the maximum of signal I is in the range from about 25 to about 400° C. and the maximum of signal II is in the range from about 475° C. to about 800° C. In one or more embodiments, the copper containing molecular sieves have a UV-VIS half-height-half-width wavelength in the range from about 15 to about 35 nm. According to one or more embodiments, the copper containing CHA molecular sieves shows at least one peak in diffuse reflectance FT-IR spectroscopy method (DRIFT) at about 1948 $cm^{-1}$.

One or more embodiments pertains to a catalyst containing copper containing molecular sieves with the CHA structure made according to the processes described above. In one or more embodiments, the molecular sieve with the CHA structure is zeolitic Chabazite with a silica to alumina mole ratio in the range of about 15 to about 40 and a copper to aluminum atomic ratio in the range of about 0.25 and about 0.50. In one or more embodiments, the catalyst is disposed on a honeycomb substrate for use in the selective reduction (SCR) of nitrogen oxides, wherein the catalyst exhibits NOx conversion activity exceeding the NOx conversion activity in the temperature range of about 200° C. to about 450° C. than a catalyst containing molecular sieves with the CHA structure prepared under similar conditions and with concentration of copper is 0.30 molar. In one or more embodiments, the catalyst is disposed on a honeycomb substrate for use in the selective reduction (SCR) of nitrogen oxides, wherein the catalyst exhibits a fluctuation in NOx conversion activity less than the fluctuation in NOx conversion activity in the temperature range of about 200° C. to about 450° C. than a catalyst containing molecular sieves with the CHA structure prepared under similar conditions and with a concentration of copper equal to 0.30 molar.

Other embodiments pertain to use of catalyst containing copper containing molecular sieves with the CHA structure made according to the processes above as a catalyst for the selective reduction (SCR) of nitrogen oxides $NO_x$; for the oxidation of $NH_3$; for the decomposition of $N_2O$; for soot oxidation; for emission control in Advanced Emission Systems; as additive in fluid catalytic cracking (FCC) processes; as catalyst in organic conversion reactions; or as catalyst in "stationary source" processes.

One or more embodiments pertains to an exhaust gas treatment system comprising an exhaust gas stream containing ammonia and a catalyst containing molecular sieves with the CHA structure made according to the processes described above, a catalyzed soot filter and a diesel oxidation catalyst.

Other embodiments pertain to method of selectively reducing nitrogen oxides $NO_x$, wherein a gaseous stream containing nitrogen oxides $NO_x$, is contacted with molecular sieves with the CHA structure according to the embodiments described above

DETAILED DESCRIPTION

Surprisingly, the fluctuations observed in the NOx conversion activity can be minimized by using a liquid copper solution wherein the concentration of copper is in the range of about 0.001 to about 0.25 molar in the copper exchange step. In addition to the non-appearance of the fluctuation in the NOx conversion activity, an overall increase in the NOx conversion was observed using the described concentration in the copper exchange step.

As used in this specification and the appended claims, the singular forms "a", "an" and "the" include plural referents unless the context clearly indicates otherwise. Thus, for example, reference to "a catalyst" includes a mixture of two or more catalysts, and the like.

As used in this specification and the appended claims, the term "Na+-form of Chabazite" refers to the calcined form of this zeolite without any ion exchange. In this form, the zeolite generally contains a mixture of Na+ and H+ cations in the exchange sites. The fraction of sites occupied by Na+ cations varies depending on the specific zeolite batch and recipe.

A molecular sieve can be zeolitic-zeolites—or non-zeolitic, and zeolitic and non-zeolitic molecular sieves can have the chabazite crystal structure, which is also referred to as the CHA structure by the International Zeolite Association. Zeolitic chabazite include a naturally occurring tectosilicate mineral of a zeolite group with approximate formula: (Ca, $Na_2$, $K_2$, Mg)$Al_2Si_4O_{12}$.$6H_2O$ (e.g., hydrated calcium aluminum silicate). Three synthetic forms of zeolitic chabazite are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et al; Zeolite D, described in British Patent No. 868,846 (1961); and Zeolite R, described in U.S. Pat. No. 3,030,181, which are hereby incorporated by reference. Synthesis of another synthetic form of zeolitic chabazite, SSZ-13, is described in U.S. Pat. No. 4,544,538, which is hereby incorporated by reference. Synthesis of a synthetic form of a non-zeolitic molecular sieve having the chabazite crystal structure, silicoaluminophosphate 34 (SAPO-34), is described in U.S. Pat. No. 4,440,871 and No. 7,264,789, which are hereby incorporated by reference. A method of making yet another synthetic no-zeolitic molecular sieve having chabazite structure, SAPO-44, is described in U.S. Pat. No. 6,162,415, which is hereby incorporated by reference. CHA:

In specific embodiments the copper containing molecular sieves with the CHA structure include all aluminosilicate, borosilicate, gallosilicate, MeAPSO, and MeAPO compositions. These include, but are not limited to SSZ-13, SSZ-62, natural chabazite, zeolite K-G, Linde D, Linde R, LZ-218, LZ-235. LZ-236ZK-14, SAPO-34, SAPO-44, SAPO-47, ZYT-6, CuSAPO-34, CuSAPO-44, and CuSAPO-47. Most preferably the material will have the aluminosilicate composition, such as SSZ-13 and SSZ-62.

Preparation of $Na^+/K^+$-Zeolites:

Synthesis of the alkali metal (for example $Na^+$ or $K^+$)-zeolites having the CHA structure can be carried out according to various techniques known in the art. For example, in a typical SSZ-13 synthesis, a source of silica, a source of alumina, and an organic directing agent are mixed under alkaline aqueous conditions. Typical silica sources include various types of fumed silica, precipitated silica, and colloidal silica, as well as silicon alkoxides. Typical alumina sources include boehmites, pseudo-boehmites, aluminum hydroxides, aluminum salts such as aluminum sulfate or sodium aluminate, and aluminum alkoxides. Sodium hydroxide is typically added to the reaction mixture. A typical directing agent for this synthesis is adamantyltrimethylammonium hydroxide, although other amines and/or quaternary ammonium salts may be substituted or added to the latter directing agent. The reaction mixture is heated in a pressure vessel with stirring to yield the crystalline SSZ-13 product. Typical reaction temperatures are in the range of 100 and 200° C., and in specific embodiments between 135 and 170° C. Typical reaction times are between 1 hr and 30 days, and in specific embodiments, between 10 hours and 3 days.

At the conclusion of the reaction, optionally the pH is adjusted to between 6 and 10, and in specific embodiments, between 7 and 7.5, and the product is filtered and washed with water. Any acid can be used for pH adjustment, and in specific embodiments nitric acid is used. Alternatively, the product may be centrifuged. Organic additives may be used to help with the handling and isolation of the solid product. Spray-drying is an optional step in the processing of the product. The solid product is thermally treated in air or nitrogen. Alternatively, each gas treatment can be applied in various sequences, or mixtures of gases can be applied. Typical calcination temperatures are in the 400° C. to 850° C. range.

Optionally $NH_4$-Exchange to Form $NH_4$-Chabazite:

Optionally the obtained alkali metal zeolite is $NH_4$-exchanged to form $NH_4$-Chabazite. The $NH_4$-ion exchange can be carried out according to various techniques known in the art, for example Bleken, F.; Bjorgen, M.; Palumbo, L.; Bordiga, S.; Svelle, S.; Lillerud, K.-P.; and Olsbye, U. Topics in Catalysis 52, (2009), 218-228.

Copper-Exchange into to Alkali Metal or $NH_4$-Chabazite to Form Metal-Chabazite:

In specific embodiments the copper is ion exchanged into alkali metal or $NH_4$-Chabazite to form Cu-Chabazite as described below.

Concentration:

The copper concentration of the liquid copper solution used in the copper ion-exchange is in specific embodiments in the range from about 0.01 to about 0.25 molar, more specifically in the range from about 0.05 to about 0.25 molar, even more specifically in the range from about 0.1 to about 0.25 molar, even more specifically in the range from about 0.125 to about 0.25 molar, even more specifically in the range from about 0.15 to about 0.225 molar and even more specifically in the range from about 0.2.

Liquid:solid-Ratio:

The liquid to solid ratio which is defined here as the weight of water and copper salt used to prepare the Cu solution relative to the dry weight of the starting zeolite used in the copper exchange step is in specific embodiments in the range from about 0.1 to about 800, more specifically in the range from about 2 to about 80, even more specifically in the range from about 2 to about 15, even more specifically in the range from about 2 to about 10, even more specifically in the range from about 4 to about 8.

Combination:Concentration-Liquid:Solid Ratio:

According to a specific embodiment of the present invention, the concentration of the copper solution used in the copper ion-exchange step is in the range from 0.1 to about 0.25, and the liquid to solid ratio which is defined here as the weight of water and copper salt used to prepare the Cu solution relative to the weight of the starting zeolite is in the range from about 2 to about 10. In more specific embodiments, the concentration of the copper solution used in the copper ion-exchange is in the range from 0.15 to about 0.225, and the liquid to solid ratio is in the range from about 4 to about 8.

Reaction Temperature:

The reaction temperature of the copper-exchange step is in specific embodiments in the range of about 15 to about 100° C., more specifically in the range of about 20 to about 60° C. In specific embodiments where an ammoniacal solution of copper ions is used as copper source, the reaction temperature is in the range of about 20 to about 35° C., even more specifically in the range of about 20 to about 25° C.

Addition Order of Reactants:

The reactants zeolite, copper source and water may be added in any order. In specific embodiments, the zeolite is added to a premade solution of copper salt or complex, which can be at room temperature or already preheated to the ion-exchange temperature. In even more specific embodiments, the premade solution of copper salt or complex is heated to a temperature of about 20 to about 90° C., even more specifically of about 40 to about 75° C., even more specifically of about 55 to about 65° C. before adding the zeolite.

Reaction Time:

The reaction time of the ion-exchange step according to some embodiments is in the range of about 1 minute to about 24 hours. In more specific embodiments the reaction time of the ion-exchange is in the range of about 30 minutes to about 8 hours, even more specifically in the range of about 1 minute to about 10 hours, even more specifically from about 10 minutes to about 5 hours, even more specifically in the range of about 10 minutes to about 3 hours, even more specifically from about 30 minutes to about 1 hour.

Reaction Conditions:

The aqueous solution in specific embodiments is suitably stirred. In general, the stirring speed is decreased as the reactor size increases.

pH: Use of Acidic Additives:

In specific embodiments, the pH of the ion-exchange step is in the range of about 1 to about 6, more specifically in the range of about 2 to about 6, and even more specifically in the range of about 3 to about 5.5. In one or more embodiments where an ammoniacal solution of copper ions is used as copper source the pH of the ion-exchange step is in the range of about 5 to about 14, and in more specific embodiments in the range of about 6 to about 12, and even more specifically in the range of about 8 to about 11.

Depending on the starting materials employed, it may be necessary to adjust the pH of the aqueous solution so that the pH has above-described values. In specific embodiments, the pH is adjusted to above-described values using acetic acid or ammonia which may be added as aqueous solution.

Copper Species:

In specific embodiments, copper acetate or ammoniacal solutions of copper ions are used, for example copper amine carbonate.

Ammoniacal Solutions of Copper Ions:

Panias et al. (Oryktos Ploutos (2000), 116, 47-56) report the speciation of divalent copper ions in aqueous ammoniacal solutions. Amino complexes of divalent copper $Cu(NH_3)_n^{2+}$ are in practice the predominant forms in which copper is encountered in mildly acidic to strongly alkaline ammoniacal solutions. The ion $Cu(NH_3)_4^{2+}$ is the most important ion of the $Cu^{2+}$—$NH_3$—$H_2O$ system. It shows a wide region of stability varying from mildly acidic solutions with a pH of 5 to strongly alkaline solutions with a pH of 14. The hydroxyl complexes of divalent copper are met with in the $Cu^{2+}$—$NH_3$—$H_2O$ system only in very strongly alkaline solutions with a pH greater than 12 and in dilute ammoniacal solutions with a total ammonia concentration less than 0.1M. In ammoniacal solutions copper is encountered in the form of free $Cu^{2+}$ ions only in highly acidic aqueous solutions.

Cu:Al:

Using copper acetate, the molar ratio of Cu to Al in the copper slurry for the copper-exchange step in specific embodiments is in the range of about 0.25 to about 2, more specifically in the range from about 0.5 to 2, even more specifically in the range from about 0.5 to 1.5, even more specifically in the range from about 0.5 to about 1.2. Using ammoniacal solutions of copper ions, the ratio of Cu to Al in specific embodiments is in the range of about 0.001 to about 1, more specifically in the range from about 0.25 to about 0.8, even more specifically in the range from about 0.25 to about 0.6, even more specific in the range from about 0.25 to about 0.5. In specific embodiments, the slurry is composed of a zeolite dispersed in a copper solution.

Repeating Ion-Exchange:

The copper-exchange step may be repeated for 0 to 10 times, and in specific embodiments 0 to 2 times. In one or more embodiments, the copper exchange step is conducted once and not repeated.

Post-Treatment:

According to one or more embodiments, after the copper exchange step, the exchange slurry containing the copper containing molecular sieve with the CHA structure is suitably separated from the mother liquor. Prior to separation, the temperature of the mother liquor may be suitably decreased to a desired value employing a suitable cooling rate.

This separation can be effected by all suitable methods known to the skilled person, for example, by decantation, filtration, ultrafiltration, diafiltration or centrifugation methods or, for example, spray drying and spray granulation methods.

The molecular sieve with the CHA structure may be washed at least once with a suitable washing agent. It is possible to use identical or different washing agents or mixtures of washing agents in the case of at least two of the washing steps.

Washing agents used may be, for example, water, alcohols, such as, for example, methanol, ethanol or propanol, or mixtures of two or more thereof. For example, mixtures of two or more alcohols, such as, for example, methanol and ethanol or methanol and propanol or ethanol and propanol or methanol and ethanol and propanol, or mixtures of water and at least one alcohol, such as, for example, water and methanol or water and ethanol or water and propanol or water and methanol and ethanol or water and methanol and propanol or water and ethanol and propanol or water and methanol and ethanol and propanol, may be mentioned as mixtures.

The washwater temperature of the washing step in specific embodiments is in the range of about 10 to about 100° C., even more specifically in the range from about 15 to about 60° C., even more specifically in the range from about 20 to about 35° C., even more specifically in the range from about 20 to about 25° C.

After separation and optionally washing, the copper containing molecular sieve with the CHA structure may be dried. The drying temperatures and duration of drying can be performed using known techniques. The drying temperature in specific embodiments is in the range of from about room temperature to about 200° C. and the duration of drying in specific embodiments is in the range of from about 0.1 to about 48 h.

After separation, optionally washing and drying, the copper containing molecular sieve with the CHA structure may be calcined in at least one additional step.

The calcination of the molecular sieve with the CHA structure in specific embodiments is effected at a temperature in the range of about 0° C. up to about 750° C. According to one or more alternative embodiments, if the calcination is carried out under static conditions, such as, e.g., in a muffle furnace, temperatures of up to about 500 to about 750° C. can be used. According to another alternative embodiment, if the calcination is carried out under dynamic conditions, such as, e.g., in a rotary calciner, temperatures of up to about 500 to about 750° C. can be used.

The calcination can also be carried out stepwise at successive temperatures. The term "stepwise at successive temperatures" as used in the context of embodiments of the invention designates a calcination in which the zeolite to be calcined is heated to a certain temperature, kept at this temperature for a certain time and heated from this temperature to at least one further temperature and kept there in turn for a certain time. By way of example, a stepwise calcination is described in the international patent application having the application number PCT/EP2009/056036. PCT/EP2009/056036 is incorporated by reference.

The calcination can be effected in any suitable atmosphere, such as, for example, air, lean air depleted in oxygen, oxygen, nitrogen, water steam, synthetic air, carbon dioxide. The calcination is in specific embodiments effected under air. It is also conceivable that calcination is carried out in a dual mode, i.e. a mode comprising a first calcination in an oxygen-reduced or oxygen-free atmosphere, said mode comprising a second calcination in an oxygen-enriched or pure oxygen atmosphere.

According to a specific embodiment, a first calcination step is carried out in a atmosphere comprising about 5 to about 15% air and about 80 to about 95% nitrogen, whereas the second calcination step is carried out in a atmosphere comprising about 100% air.

Embodiments of the invention also relates to the copper containing molecular sieves with the CHA structure, obtainable or obtained by above-described process.

$Cu^{2+}$ Versus CuO:

In specific embodiments, the copper containing molecular sieve with the CHA structure shows a weight ratio of exchanged copper to copper oxide of at least about 1, measured after calcination of the zeolite at 450° C. in air for 1 hour. In specific embodiments, the ratio of exchanged copper to copper oxide is at least about 1.5. Even more specifically the ratio of exchanged copper to copper oxide is at least about 2.

In specific embodiments, the exchanged copper is located in the active sites named C and H site. Thus, the copper containing molecular sieve with the CHA structure in specific embodiments exhibits a peak at about 1948 $cm^{-1}$ (site C) and optionally at about 1929 $cm^{-1}$ (site H) measured by diffuse reflectance FT-IR spectroscopy method (DRIFT).

The use of FTIR technique has been demonstrated in the literature, for example Giamello et al., J. Catal. 136, 510-520 (1992).

H$_2$ TPR Spectra:

In specific embodiments, the calcined copper containing molecular sieve with the CHA structure shows at least two signals in a H$_2$ TPR spectra, whereas the maximum of signal I is in the range of 25 to 400° C. and the maximum of signal II is in the range from about 475° C. to about 800° C., measured after calcination of the zeolite at 500° C. in air for 30 min.

Signal I may correlate to two reactions i) $Cu^{2+}+\frac{1}{2}H_2=Cu^++H^+$ and ii) $CuO+H_2=Cu+H_2O$ and signal II may correlate to one reaction iii) $Cu^++\frac{1}{2}H_2=Cu+H^+$, whereas the maximum of the signal II is in the range from about 475° C. to about 800° C.

In specific embodiments, the maximum of signal II is in the range from about 480° C. to about 800° C., even more specifically in the range from about 490° C. to about 800° C., even more specifically in the range from about 550° C. to about 800° C.

The use of this technique for the evaluation of metal-containing zeolites has been demonstrated in the literature. For example, Yan and co-workers report on the properties of Cu-ZSM-5 in Journal of Catalysis, 161, 43-54 (1996).

UV-VIS:

In specific embodiments, the calcined copper containing molecular sieve with the CHA structure has a UV-VIS half-height-half-width wavelength in the range from about 5 to about 35 nm, more specifically in the range from about 10 to 30 nm, even more specifically in the range from about 15 to about 25 nm, measured after calcination of the zeolite at 450° C. in air for 1 hour.

The use of UV-VIS technique has been demonstrated in the literature, for example J. Catal. 220, 500-512 (2003).

Wt. % Copper:

The Cu content of the copper containing molecular sieve with the CHA structure, calculated as CuO, in specific embodiments is at least about 1.5 wt.-%, even more specifically at least about 2 wt.-% and in even more specific embodiments at least about 2.5 wt.-%, reported on a volatile-free basis. In even more specific embodiments, the Cu content of the molecular sieve with the CHA structure, calculated as CuO, is in the range of up to about 5 wt.-%, more specifically of up to about 4 wt.-%, and even more specifically of up to about 3.5 wt.-%, in each case based on the total weight of the calcined molecular sieve with the CHA structure reported on a volatile free basis. Therefore, in specific embodiments, ranges of the Cu content of the molecular sieve with the CHA structure, calculated as CuO, are from about 2 to about 5 wt.-%, more specifically from about 2 to about 4 wt.-%, and even more specifically from about 2.5 to about 3.5 wt.-%, and even more specifically from about 2.75 to about 3.25 wt.-%, in each case reported on a volatile-free basis. All wt.-% values are reported on a volatile free basis.

Free Copper:

In addition to the copper that is exchanged to increase the level of copper associated with the exchanged sites in the structure of the zeolite, non-exchanged copper in salt from may be present in the molecular sieve with the CHA structure, so called free copper. However, in specific embodiments no free copper is present in the molecular sieves with the CHA structure.

Silica/Alumina:

In specific embodiments, the copper containing molecular sieve with the CHA structure has a mole ratio of silica to alumina greater than about 15, even more specifically greater than about 20. In specific embodiments, the copper containing Chabazite has a mole ratio of silica to alumina in the range from about 20 to about 256, more specifically in the range from about 25 to about 40.

Cu/Al:

In specific embodiments, the atomic ratio of copper to aluminum exceeds about 0.25. In more specific embodiments, the ratio of copper to aluminum is from about 0.25 to about 1, even more specifically from about 0.25 to about 0.5. In even more specific embodiments, the ratio of copper to aluminum is from about 0.3 to about 0.4.

SCR Activity:

In specific embodiments, the copper containing molecular sieve with the CHA structure exhibits an aged NOx conversion at 200° C. of at least 50% measured at a gas hourly space velocity of 80000 h$^{-1}$. In specific embodiments the copper containing molecular sieve with the CHA structure exhibits an aged NOx conversion at 450° C. of at least 70% measured at a gas hourly space velocity of 80000 h$^{-1}$. More specifically the aged NOx conversion at 200° C. is at least 55% and at 450° C. at least 75%, even more specifically the aged NOx conversion at 200° C. is at least 60% and at 450° C. at least 80%, measured at a gas hourly volume-based space velocity of 80000 h$^{-1}$ under steady state conditions at maximum NH$_3$-slip conditions in a gas mixture of 500 ppm NO, 500 ppm NH$_3$, 10% O$_2$, 5% H$_2$O, balance N$_2$. The cores [WHAT ARE CORES] were hydrothermally aged in a tube furnace in a gas flow containing 10% H$_2$O, 10% O$_2$, balance N$_2$ at a space velocity of 4,000 h$^{-1}$ for 6 h at 850° C.

The SCR activity measurement has been demonstrated in the literature, for example WO 2008/106519.

Sodium Content:

In specific embodiments the copper containing molecular sieve with the CHA structure has a sodium content (reported as Na$_2$O on a volatile free basis) of below 2 wt.-%, based on the total weight of the calcined molecular sieve with the CHA structure. In more specific embodiments, sodium content is below 1 wt.-%, even more specifically below 2000 ppm, even more specifically below 1000 ppm, even more specifically below 500 ppm and most specifically below 100 ppm.

Na:Al:

In specific embodiments, the copper containing molecular sieve with the CHA structure has an atomic sodium to aluminum ratio of less than 0.7. In more specific embodiments, the atomic sodium to aluminum ratio is less than 0.35, even more specifically less than 0.007, even more specifically less than 0.03 and even more specifically less than 0.02.

Na:Cu:

In specific embodiments, the copper containing molecular sieve with the CHA structure has an atomic copper to sodium ratio of greater than 0.5. In more specific embodiments, the atomic copper to sodium ratio of greater than 1, even more specifically greater than 10, even more specifically greater than 50.

Additional Metal:

The copper containing molecular sieve with the CHA structure may contain one or more transition metals. In specific embodiments, the molecular sieve with the CHA structure may contain transition metals capable of oxidizing NO to NO$_2$ and/or storing NH$_3$. The transition metal is in specific embodiments selected from the group consisting of Fe, Co, Ni, Zn, Y, Ce, Zr and V. Generally, all suitable sources for Fe, Co, Ni, Zn, Y, Ce, Zr and V can be employed. By way of example, nitrate, oxalate, sulphate, acetate, carbonate, hydroxide, acetylacetonate, oxide, hydrate, and/or salts such as chloride, bromide, iodide may be mentioned.

In addition, the copper containing molecular sieve with the CHA structure may contain one or more lanthanides. In a specific embodiment, a lanthanide source is, among others, lanthanum nitrate.

In addition, the copper containing molecular sieve with the CHA structure may contain one or more precious metals (e.g. Pd, Pt).

BET:

In specific embodiments, the copper containing molecular sieve with the CHA structure exhibits a BET surface area, determined according to DIN 66131, of at least about 400 m$^2$/g, more specifically of at least about 550 m$^2$/g, even more specifically of at about 650 m$^2$/g. In specific embodiments, the molecular sieve with the CHA structure exhibits a BET surface area in the range from about 400 to about 750 m$^2$/g, more specifically from about 500 to about 750 m$^2$/g, even more specifically from about 600 to Mean length of crystallites:

In specific embodiments, the crystallites of the calcined copper containing molecular sieve with the CHA structure have a mean length in the range of from 10 nanometers to 100 micrometers, specifically in the range of from 50 nanometers to 5 micrometers, more specifically in the range of 50 nanometers to 500 nanometers as determined via SEM.

TOC:

In specific embodiments, the calcined copper containing molecular sieve with the CHA structure has a TOC (total organic carbon) content of 0.1 wt.-% or less, based on the total weight of the molecular sieve with the CHA structure.

Thermal Stability:

In specific embodiments, the calcined copper containing molecular sieve with the CHA structure has a thermal stability, determined via differential thermal analysis or differential scanning calorimetry, in the range of from about 900 to about 1400° C., specifically in the range of from about 1100 to about 1400° C., more specifically in the range of from about 1150 to about 1400° C. For example, the measurement of thermal stability is described in PCT/EP2009/056036 at page 38.

Shape:

The molecular sieve with the CHA structure according to embodiments of the invention may be provided in the form of a powder or a sprayed material obtained from above-described separation techniques, e.g. decantation, filtration, centrifugation, or spraying.

In general, the powder or sprayed material can be shaped without any other compounds, e.g. by suitable compacting, to obtain moldings of a desired geometry, e.g. tablets, cylinders, spheres, or the like.

By way of example, the powder or sprayed material is admixed with or coated by suitable modifiers well known in the art. By way of example, modifiers such as silica, alumina, zeolites or refractory binders (for example a zirconium precursor) may be used. The powder or the sprayed material, optionally after admixing or coating by suitable modifiers, may be formed into a slurry, for example with water, which is deposited upon a suitable refractory carrier (for example WO 2008/106519).

The molecular sieve with the CHA structure of embodiments of the invention may also be provided in the form of extrudates, pellets, tablets or particles of any other suitable shape, for use as a packed bed of particulate catalyst, or as shaped pieces such as plates, saddles, tubes, or the like.

Catalyst:

Thus, embodiments of the invention relates to a catalyst containing a copper containing molecular sieves with the CHA structure, obtainable or obtained by above-described process, disposed on a substrate.

The substrate may be any of those materials typically used for preparing catalysts, and will usually comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The substrate can also be a wall-flow filter substrate, where the channels are alternately blocked, allowing a gaseous stream entering the channels from one direction (inlet direction), to flow through the channel walls and exit from the channels from the other direction (outlet direction). In addition, suitable carriers/substrates as well as suitable coating processes are described in the international patent application having the application number PCT/EP2009/056036 and in WO 2008/106519. PCT/EP2009/056036 and WO 2008/106519 are incorporated by reference.

SCR/Exhaust Gas Treatment System:

In general, the copper containing molecular sieves with the CHA structure described above can be used as molecular sieve, adsorbent, catalyst, catalyst support or binder thereof. In especially specific embodiments, the material is used as catalyst.

Moreover, embodiments of the invention relates to a method of catalyzing a chemical reaction wherein the copper containing molecular sieves with the CHA structure according to embodiments of the invention is employed as catalytically active material.

Among others, said catalyst may be employed as catalyst for the selective reduction (SCR) of nitrogen oxides (NO$_x$); for the oxidation of NH$_3$, in particular for the oxidation of NH$_3$ slip in diesel systems; for the decomposition of N$_2$O; for soot oxidation; for emission control in Advanced Emission Systems such as Homogeneous Charge Compression Ignition (HCCI) engines; as additive in fluid catalytic cracking (FCC) processes; as catalyst in organic conversion reactions; or as catalyst in "stationary source" processes. For applications in oxidation reactions, in specific embodiments an additional precious metal component is added to the copper chabazite (e.g. Pd, Pt).

Therefore, embodiments of the invention also relate to a method for selectively reducing nitrogen oxides (NO$_x$) by contacting a stream containing NO$_x$ with a catalyst containing the copper containing molecular sieves with the CHA structure according to embodiments of the invention under suitable reducing conditions; to a method of oxidizing NH$_3$, in particular of oxidizing NH$_3$ slip in diesel systems, by contacting a stream containing NH$_3$ with a catalyst containing the copper containing molecular sieves with the CHA structure according to embodiments of the invention under suitable oxidizing conditions; to a method of decomposing of N$_2$O by contacting a stream containing N$_2$O with a catalyst containing the copper containing molecular sieves with the CHA structure according to embodiments of the invention under suitable decomposition conditions; to a method of controlling emissions in Advanced Emission Systems such as Homogeneous Charge Compression Ignition (HCCI) engines by contacting an emission stream with a catalyst containing the copper containing molecular sieves with the CHA structure according to embodiments of the invention under suitable conditions; to a fluid catalytic cracking FCC process wherein the copper containing molecular sieves with the CHA structure according to embodiments of the invention is employed as additive; to a method of converting an organic compound by contacting said compound with a catalyst containing the copper containing molecular sieves with the CHA structure according to embodiments of the invention under suitable conversion conditions; to a "stationary source" process wherein a catalyst is employed containing the copper containing molecular sieves with the CHA structure according to embodiments of the invention.

In particular, the selective reduction of nitrogen oxides wherein the molecular sieves with the CHA structure according to embodiments of the invention is employed as catalytically active material is carried out in the presence of ammonia or urea. While ammonia is the reducing agent of choice for stationary power plants, urea is the reducing agent of choice for mobile SCR systems. Typically, the SCR system is integrated in the exhaust gas treatment system of a vehicle and, also typically, contains the following main components: SCR catalyst containing the molecular sieves with the CHA structure according to embodiments of the invention; a urea storage tank; a urea pump; a urea dosing system; a urea injector/nozzle; and a respective control unit.

Method of Reducing $NO_x$:

Therefore, embodiments of the invention also relate to a method for selectively reducing nitrogen oxides ($NO_x$), wherein a gaseous stream containing nitrogen oxides ($NO_x$), for example exhaust gas formed in an industrial process or operation, and in specific embodiments also containing ammonia and/or urea, is contacted with the molecular sieves with the CHA structure according to embodiments of the invention.

The term nitrogen oxides, $NO_x$, as used in the context of embodiments of the invention designates the oxides of nitrogen, especially dinitrogen oxide ($N_2O$), nitrogen monoxide (NO), dinitrogen trioxide ($N_2O_3$), nitrogen dioxide ($NO_2$), dinitrogen tetroxide ($N_2O_4$), dinitrogen pentoxide ($N_2O_5$), nitrogen peroxide ($NO_3$).

The nitrogen oxides which are reduced using a catalyst containing the molecular sieves with the CHA structure according to embodiments of the invention or the molecular sieves with the CHA structure obtainable or obtained according to embodiments of the invention may be obtained by any process, e.g. as a waste gas stream. Among others, waste gas streams as obtained in processes for producing adipic acid, nitric acid, hydroxylamine derivatives, caprolactame, glyoxal, methyl-glyoxal, glyoxylic acid or in processes for burning nitrogenous materials may be mentioned.

In especially specific embodiments, a catalyst containing the molecular sieves with the CHA structure according to embodiments of the invention or the molecular sieves with the CHA structure obtainable or obtained according to embodiments of the invention is used for removal of nitrogen oxides ($NO_x$) from exhaust gases of internal combustion engines, in particular diesel engines, which operate at combustion conditions with air in excess of that required for stoichiometric combustion, i.e., lean.

Therefore, embodiments of the invention also relate to a method for removing nitrogen oxides ($NO_x$) from exhaust gases of internal combustion engines, in particular diesel engines, which operate at combustion conditions with air in excess of that required for stoichiometric combustion, i.e., at lean conditions, wherein a catalyst containing the molecular sieves with the CHA structure according to embodiments of the invention or the molecular sieves with the CHA structure obtainable or obtained according to embodiments of the invention is employed as catalytically active material.

Exhaust Gas Treatment System:

Embodiments of the invention relates to an exhaust gas treatment system comprising an exhaust gas stream optionally containing a reductant like ammonia, urea and/or hydrocarbon, and in specific embodiments, ammonia and/or urea, and a catalyst containing a copper containing molecular sieves with the CHA structure, obtainable or obtained by above-described process, disposed on a substrate, a soot filter and a diesel oxidation catalyst.

The soot filter, catalyzed or non-catalyzed, may be upstream or downstream of said catalyst. The diesel oxidation catalyst in specific embodiments is located upstream of said catalyst. In specific embodiments, said diesel oxidation catalyst and said catalyzed soot filter are upstream from said catalyst.

In specific embodiments, the exhaust is conveyed from the diesel engine to a position downstream in the exhaust system, and in more specific embodiments, containing NOx, where a reductant is added and the exhaust stream with the added reductant is conveyed to said catalyst.

For example, a catalyzed soot filter, a diesel oxidation catalyst and a reductant are described in WO 2008/106519 which is incorporated by reference.

The following examples shall further illustrate the process and the materials of embodiments of the invention.

EXAMPLES

1. Comparative Example

2. Preparation of Ammonium Exchanged SSZ-13

The ammonium exchanged SSZ-13 filtercake was prepared as described in U.S. Pat. No. 4,544,538.

1. Copper Exchange Step (Copper Concentration: 0.3 molar)

Copper acetate monohydrate (3.46 KG, 17.34 moles) was added to deionized water (43.1 KG) in a stirred tank at room temperature. The reactor was heated to 60° C. in ca. 30 minutes, followed by addition of ammonium exchanged SSZ-13 filtercake (25.6 KG asis, 10.9 KG SSZ-13). Mixing was continued for 60 minutes while maintaining a reaction temperature of 60° C. Vessel contents were transferred to a plate and frame filterpress for removal of supernatant, washing and drying. Cu-exchanged SSZ-13 was washed with deionized water until filtrate conductivity was below 300 microsiemens, then air-dried on the filterpress. Table1 lists the important synthesis parameters for the ion-exchange in the preparation of example #1 to example #5.

1. Coating of Catalyst

For the preparation of coated monolithic test scores, the filtercake (water content of 45% measured after calcination at 600° C. in air for 1 hour) was made into a slurry of 38-45% solid content by adding deionized water. The Cu-CHA slurry was then milled in a ceramic ball mill to a particle size of D90 of less than 10 μm (for example 4 to 10 μm) measured with a Sympatec particle size analyzer using forward Laser scattering. No acid or binder were added to the slurry in order to probe the intrinsic activity of the catalyst. The milled slurry was coated onto a ceramic monolith (NGK) of 1" diameter and 2" length having 400 cpsi cell density and 6 mil wall thickness. The target dry gain was 2.3 g/in$^3$ which corresponds to the loading of active catalyst in WO 2008/106519. Typically two to three coats were needed to reach that target, the solid content of the additional coats has been adjusted to meet the desired target dry gain increase. After each coat the core was dried for 3 h at 90° C. in air. The last drying step was followed by a calcination for 1 h at 450° C. in air in a muffle funnel.

1. Aging and Catalytic Testing

The cores were hydrothermally aged in a tube furnace in a gas flow containing 10% $H_2O$, 10% $O_2$, balance $N_2$ at a volume-based space velocity of 8,000 h$^{-1}$ for 6 h at 850° C.

This aging protocol has been chosen for the quality control test of Cu-CHA SCR catalysts.

The DeNO$_x$ activity was measured under steady state conditions at maximum NH$_3$-slip conditions on a laboratory reactor in a gas mixture of 500 ppm NO, 500 ppm NH$_3$, 10% O$_2$, 5% H$_2$O, balance N$_2$ at a volume-based space velocity of 80,000 h$^{-1}$ at 200° C., 250° C., 300° C., and 450° C. Table 1 contains the DeNOx activity after aging at 200, 250, 300 and 450° C.

TABLE 1

Copper exchange conditions, chemical analysis and DeNOx activity of coated catalyst at 200 and 450° C. after hydrothermal aging.

|  | 1 | 2 | 3 | 4 | 5 |
|---|---|---|---|---|---|
| SiO$_2$:Al$_2$O$_3$ | 32 | 33 | 33 | 33 | 33 |
| BET | 644 | 633 | 617 | 617 | 628 |
| molar | 0.3 | 0.3 | 0.3 | 0.3 | 0.3 |
| CuO | 2.91 | 3.25 | 3.2 | 3.4 | 3.4 |
| 200° C. | 59 | 56 | 62 | 55 | 65 |
| 250° C. | 88 | 86 | 90 | 82 | 94 |
| 300° C. | 91 | 90 | 91 | 88 | 92 |
| 450° C. | 77 | 74 | 80 | 77 | 82 |

2. Inventive Example 2.1 Preparation of Ammonium Exchanged SSZ-13

The ammonium exchanged SSZ-13 filtercake was prepared as described in 1.1.

2.2 Copper Exchange Step (Copper Concentration: 0.2 molar)

Copper acetate monohydrate (2.28 KG, 11.43 moles) was added to deionized water (42.7 KG) in a stirred tank at room temperature. The reactor was heated to 60° C. in ca. 30 minutes, followed by addition of ammonium exchanged SSZ-13 filtercake (25.3 KG asis, 10.8 KG SSZ-13). Mixing was continued for 60 minutes while maintaining a reaction temperature of 60° C. Vessel contents were transferred to a plate and frame filterpress for removal of supernatant, washing and drying. Cu-exchanged SSZ-13 was washed with deionized water until filtrate conductivity was below 300 microsiemens, then air-dried on the filterpress. Table2 lists the important synthesis parameters for the ion-exchange in the preparation of example #6 to example #11.

2.3 Coating of Catalyst

The coating of the catalyst was done as described in 1.3.

2.4 Aging and Catalytic Testing

The aging and catalytic testing was done as described in 1.4. Table 2 contains the DeNOx activity after aging at 200, 250, 300 and 450° C.

TABLE 2

Copper exchange conditions, chemical analysis and DeNOx activity of coated catalyst at 200 and 450° C. after hydrothermal aging.

|  | 6 | 7 | 8 | 9 | 10 | 11 |
|---|---|---|---|---|---|---|
| SiO$_2$:Al$_2$O$_3$ | 32 | 33 | 33 | 33 | 32 | 33 |
| BET | 644 | 633 | 633 | 628 | 638 | 627 |
| molar | 0.2 | 0.2 | 0.2 | 0.2 | 0.2 | 0.2 |
| CuO | 2.62 | 2.81 | 2.94 | 2.7 | 3.24 | 2.71 |
| 200° C. | 63 | 63 | 66 | 68 | 64 | 63 |
| 250° C. | 90 | 90 | 92 | 93 | 90 | 90 |
| 300° C. | 92 | 94 | 95 | 93 | 94 | 93 |
| 450° C. | 82 | 83 | 82 | 80 | 80 | 81 |

3. Comparison Examples #1 to #5 and Examples #6 to #11

The observed fluctuation in the NOx conversion activity using a liquid copper solution having concentration of copper of about 0.3 molar can be strongly decreased by using a liquid copper solution having concentration of copper of about 0.2 molar. In addition, the NOx conversion activity can be increased by using a liquid copper solution having concentration of copper of about 0.2 molar. The maximal fluctuations per temperature are listed in table 3. The NOx conversion activities at an average per temperature are listed in table 4.

TABLE 3

Fluctuation of NOx conversion activity

| | molar | |
|---|---|---|
| | 0.2 | 0.3 |
| Δ 200° C. | 5 | 10 |
| Δ 250° C. | 3 | 8 |
| Δ 300° C. | 3 | 4 |
| Δ 450° C. | 3 | 8 |

TABLE 4

NOx conversion activities at an average

| | molar | |
|---|---|---|
| | 0.2 | 0.3 |
| φ 200° C. | 64.5 | 59.4 |
| φ 250° C. | 90.83 | 90 |
| φ 300° C. | 93.5 | 90.4 |
| φ 450° C. | 81.33 | 78 |

The invention claimed is:

1. A process for the preparation of copper containing molecular sieves with the CHA structure having a silica to alumina mole ratio greater than about 10, comprising providing the molecular sieve and reacting the molecular sieve with a copper source, wherein the copper exchange step is conducted via wet state exchange and prior to the coating step and wherein in the copper exchange step a liquid copper solution is used wherein the concentration of copper is in the range of about 0.001 to about 0.25 molar using copper acetate and/or an ammoniacal solution of copper ions as the copper source.

2. The process of claim 1, wherein the liquid to solid ratio defined as the weight of water used to prepare the Cu solution relative to the weight of the starting zeolite used in the copper exchange step is in the range from about 2 to about 80.

3. The process of claim 1, wherein the copper is exchanged into a Na$^+$-form or into a NH$_4$-form of Chabazite.

4. The process of claim 3, wherein the copper concentration is in the range from about 0.1 to about 0.25.

5. The process of claim 3, wherein the copper concentration is in the range from about 0.15 to about 0.225.

6. A copper containing molecular sieves with the CHA structure, obtainable or obtained by the process of claim 4, having a BET surface area of at least about 550 m$^2$/g and wherein the catalyst is disposed on a honeycomb substrate for use in the selective reduction (SCR) of nitrogen oxides (NO$_x$), wherein the catalyst exhibits NOx conversion activity exceeding the NOx conversion activity in the temperature range of about 200° C. to about 450° C. than a catalyst containing molecular sieves with the CHA structure prepared under similar conditions and with concentration of copper is 0.30 molar.

7. The copper containing molecular sieves with the CHA structure of claim 6, having a weight ratio of exchanged copper to copper oxide of at least about 1.

8. The copper containing molecular sieves with the CHA structure of claim 6, wherein that copper containing molecular sieves show at least two signals in a $H_2$ TPR spectra, whereas the maximum of signal I is in the range from about 25 to about 400° C. and the maximum of signal II is in the range from about 475° C. to about 800° C.

9. The copper containing molecular sieves with the CHA structure of claim 6, wherein that copper containing molecular sieves have a UV-VIS half-height-half-width wavelength in the range from about 15 to about 35 nm.

10. The copper containing molecular sieves with the CHA structure of claim 6 wherein that copper containing CHA molecular sieves show at least one peak in diffuse reflectance FT-IR spectroscopy method (DRIFT) at about 1948 $cm^{-1}$.

11. The catalyst of claim 6, wherein the molecular sieve with the CHA structure is zeolitic Chabazite.

12. The catalyst of claim 11, wherein the catalyst is disposed on a honeycomb substrate for use in the selective reduction (SCR) of nitrogen oxides, wherein the catalyst exhibits a fluctuation in NOx conversion activity less than the fluctuation in NOx conversion activity in the temperature range of about 200° C. to about 450° C. than a catalyst containing molecular sieves with the CHA structure prepared under similar conditions and with a concentration of copper equal to 0.30 molar.

13. The catalyst of claim 11, wherein the molecular sieve with the CHA structure is zeolitic Chabazite with a silica to alumina mole ratio in the range of about 15 to about 40 and a copper to aluminum atomic ratio in the range of about 0.25 and about 0.50.

14. The catalyst of claim 13, wherein the catalyst is disposed on a honeycomb substrate for use in the selective reduction (SCR) of nitrogen oxides, wherein the catalyst exhibits NOx conversion activity exceeding the NOx conversion activity in the temperature range of about 200° C. to about 450° C. than a catalyst containing molecular sieves with the CHA structure prepared under similar conditions and with concentration of copper is 0.30 molar.

15. The catalyst of claim 13, wherein the catalyst is disposed on a honeycomb substrate for use in the selective reduction (SCR) of nitrogen oxides, wherein the catalyst exhibits a fluctuation in NOx conversion activity less than the fluctuation in NOx conversion activity in the temperature range of about 200° C. to about 450° C. than a catalyst containing molecular sieves with the CHA structure prepared under similar conditions and with a concentration of copper equal to 0.30 molar.

16. An exhaust gas treatment system comprising an exhaust gas stream containing ammonia and a catalyst containing molecular sieves with the CHA structure of claim 11, a catalyzed soot filter and a diesel oxidation catalyst.

17. An exhaust gas treatment system comprising an exhaust gas stream containing ammonia and a catalyst containing molecular sieves with the CHA structure of claim 13, a catalyzed soot filter and a diesel oxidation catalyst.

18. A method of selectively reducing nitrogen oxides, wherein a gaseous stream containing nitrogen oxides, is contacted with molecular sieves with the CHA structure according to claim 6.

* * * * *